United States Patent [19]
Tokuda

[11] Patent Number: 5,128,519
[45] Date of Patent: Jul. 7, 1992

[54] METHOD FOR DETECTING AND POSITIONING FRAME NUMBERS IN A PHOTOGRAPHIC FILM

[75] Inventor: Kanji Tokuda, Kanagawa, Japan

[73] Assignee: Fuji Photo Film Co., Ltd., Kanagawa, Japan

[21] Appl. No.: 284,159

[22] Filed: Dec. 14, 1988

[30] Foreign Application Priority Data

| Dec. 14, 1987 | [JP] | Japan | 62-315707 |
| Dec. 14, 1987 | [JP] | Japan | 62-315708 |
| Mar. 26, 1988 | [JP] | Japan | 63-72922 |
| Apr. 20, 1988 | [JP] | Japan | 63-97467 |

[51] Int. Cl.$^5$ .............. G06K 7/10; G06K 13/00; G03B 27/52; G03B 27/32
[52] U.S. Cl. .................. 235/375; 235/462; 235/475; 250/566; 250/571; 355/41; 355/77
[58] Field of Search ............... 235/375, 376, 454, 469, 235/462, 475, 476; 250/571, 566, 568, 570; 353/26 R, 26 A, 27 R, 27 A; 355/38, 41

[56] References Cited

U.S. PATENT DOCUMENTS

| 4,207,473 | 6/1980 | Nakatani et al. | 250/570 |
| 4,555,632 | 11/1985 | Vockenhuber | 250/560 |
| 4,691,112 | 9/1987 | Wydler | 250/570 |
| 4,727,399 | 2/1988 | Matsumoto | 250/571 |
| 4,797,713 | 1/1989 | Terashita et al. | 355/38 |
| 4,806,990 | 2/1989 | Tahara | 355/75 |
| 4,825,387 | 4/1989 | Ono | 355/40 |
| 4,906,854 | 3/1990 | Rauh et al. | 250/570 |
| 4,918,484 | 4/1990 | Ujiie et al. | 355/77 |

FOREIGN PATENT DOCUMENTS 111718 9/1977 Japan .
128933 10/1981 Japan .

Primary Examiner—Stuart S. Levy
Assistant Examiner—Edward H. Sikorski
Attorney, Agent, or Firm—Sughrue, Mion, Zinn, Macpeak & Seas

[57] ABSTRACT

A photographic film is provided with decimal numbers and bar codes both representative of serial frame numbers. When a sensor reads a bar code, measurement of the advanced length of the photographic film is started to obtain a distance of either the bar code or the decimal number relative to the sensor. After the positioning of a frame to be printed in a film framing mask at the printing station, a fram e number represented by a decimal number or bar code whose moved distance is within a predetermined range of distances is selected, thereby identifying the picture frame in the film framing mask to have the drawn frame number.

22 Claims, 13 Drawing Sheets

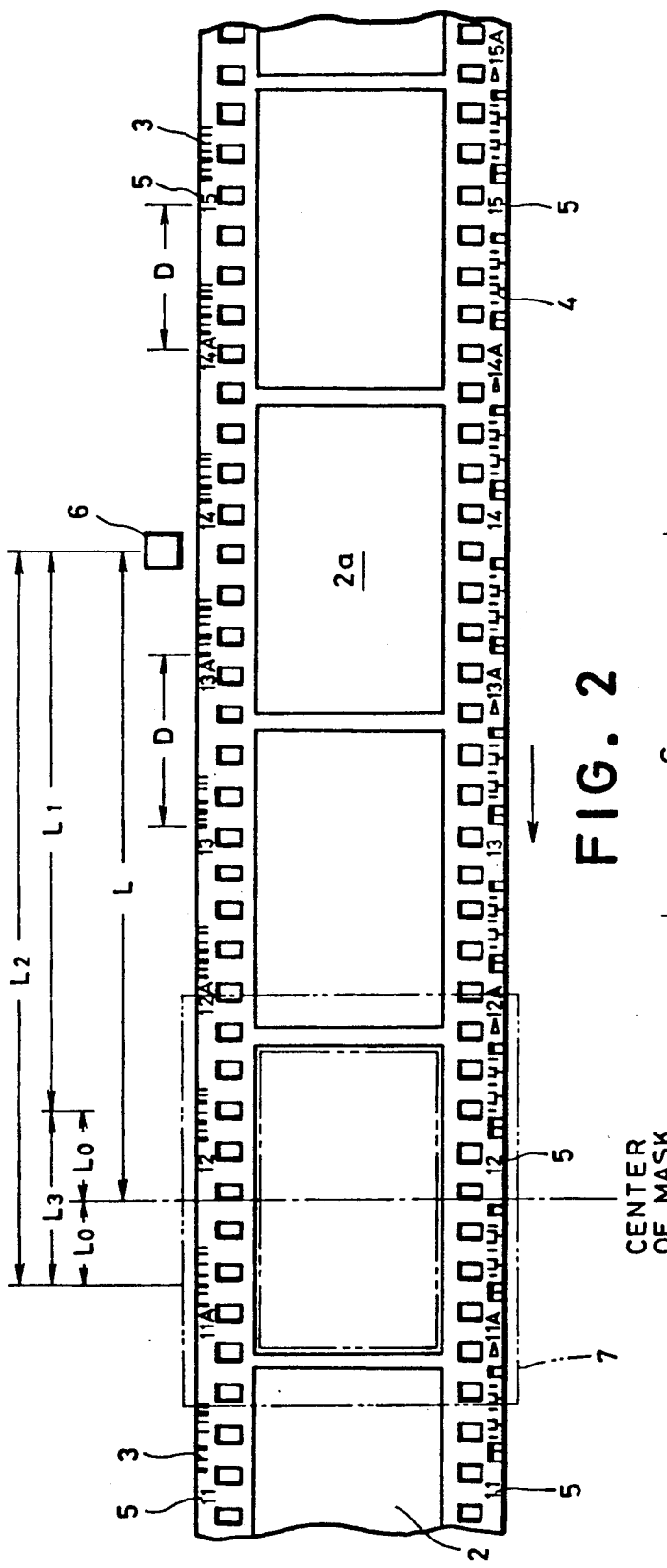
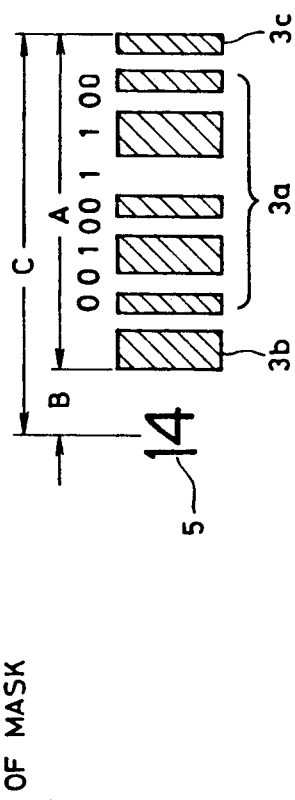

METHOD FOR DETECTING AND POSITIONING FRAME NUMBERS IN A PHOTOGRAPHIC FILM

BACKGROUND OF THE INVENTION

The present invention relates to a method of identifying a frame number of a picture frame of a photographic film, and more particularly to a method of identifying a frame number of a photographic film placed in a film framing mask, which method is used in a photographic printer, a negative film inspection apparatus, a numbering apparatus for printing frame numbers on prints or the like.

Disk films now available have a circular arrangement of exposable frames at regular angular intervals or spacings, each exposable frame being attached with a decimal number and a binary bar code both of which are latent images and represent a serial frame number. In a disk film printing system, the binary bar code is read with bar code sensor or bar code reader to print a decimal number representative of the serial frame number of each exposed frame of the disk film on the back surface of a print. Moreover, to provide extra prints of an exposed frame, the only operation required for the disk film printing system is to enter into the system data representing the serial frame number of the picture frame to be printed and the number of extra prints to be made from the picture frame. The disk film printing system reads binary codes based on the entered data to identify the serial frame number of the picture frame and then automatically places the picture frame having the specified serial frame number at a printing station. The disk film printing system, thereafter, automatically provides as many prints as requested.

Since the positions of respective exposed frames of a disk film are specifically fixed, the exposed frames and their frame numbers completely coincide with each other. However, a roll of photographic film. e.g., a 35 mm. size negative film, may not have a positive position when loaded in a camera, and exposed frames are often out of registry from correspondingly predetermined exposable frame positions. Consequently, the frame numbers printed on the film do not have one-to-one correspondence to the images, leading to many inconveniences. For instance, if extra prints of a picture frame are requested, a print made at the time the negative film is developed is visually compared with the negative film to identify the picture frame to be reprinted by its frame number.

There are known apparatus for easily identifying the frame number of a picture frame from which a print has been made. Such apparatus prints the frame number of a picture frame on the print at the time of first printing. For example, according to the apparatus disclosed in Japanese Unexamined Patent Publication No. 56-128,933, a mark is recorded on the center line of the first picture frame of a negative film and, thereafter, the frame number of each picture frame at the printing station is specified, based on the length the negative film has advanced after detection of the mark. The specified frame number is then printed by a number printer either on the peripheral margin of a print of the picture frame or on the back surface of the print. Another apparatus is disclosed in Japanese Unexamined Patent Publication No. 52-111,718. In this apparatus, if extra prints of a picture frame are requested, the frame number of the picture frame to be printed is read by an optical character reader, such as an image sensor, to identify the requested picture frame and to place the picture frame having the identified frame number in position in the film framing mask at the printing station in order to make as many prints as requested.

A problem associated with the above described apparatus is the necessity of recording a start mark or of providing a complicated optical character reader. This problem may be solved by way of providing latent image bar codes indicating the frame numbers optically printed during manufacturing of a film aside the respective exposable frames of the negative film in a manner similar to that used in manufacturing the above noted disk films. The bar code can be read with an optical sensor disposed on the passage of the negative film to identify the frame number of a picture frame positioned in the film framing mask at the printing station.

Although the provision of bar codes makes it easy to read frame numbers, it is however, still hard to form an image at each exposable frame in proper registry with the bar code.

OBJECT OF THE INVENTION

It is, therefore, an object of the present invention to provide a method of identifying the frame number of a picture frame of a photographic film which is placed in position in a film framing mask at the printing station when there is a position error between the frame number bar code and the picture frame.

SUMMARY OF THE INVENTION

To achieve the above and other objects, and advantages, the present invention provides a method of identifying a frame number of a picture frame of a photographic film having a series of picture frames each of which is accompanied with a decimal number and a bar code, both being representative of the frame number, and is placed in a film framing mask at a printing station. According to the method of the present invention, the identification of the frame number can be performed by sequentially effecting the steps of: measuring distance of advancement of the photographic film at the detection of a bar code so as to detect the distance the bar code or decimal number moves from the bar code sensor; locating the picture frame to be printed in the film framing mask at the printing station; and drawing a frame number represented by a decimal number or bar code whose distance moved is within a predetermined range of distances, thereby identifying the picture frame in the film framing mask to have the drawn frame number.

According to a particular embodiment, an advanced length of the frame number bar code or the location of a frame number bar code is detected by counting either drive pulses applied to a film advancing motor or output pulses from an encoder cooperating with a roller driven following film advanced by a pulse motor. The film is advanced by a certain length each time and is placed to position a picture frame to be printed in the film framing mask at the printing station. Then, a frame number which is within a distance range on both sides of the center of the film framing mask is drawn and specified as to be the frame number of the picture frame positioned in the film framing mask at the printing station.

According to another preferred embodiment of the present invention, side notches formed in a side margin of a film, one for each picture frame to be printed, are detected with a notch sensor at the center of the film framing mask to position the film in the film framing mask at the printing station.

According to another embodiment, the picture frame to be printed is detected with a picture image sensor to position the picture frame in the film framing mask at the printing station. The image sensor, which detects front and rear edges of the picture frame, can take any desired type such as an image area sensor, a line sensor or the like well known in the art. The image sensor is disposed above and before or after the film framing mask to sight a picture frame in the mask if taking the type of image area sensor or perpendicularly to and before the passage of a film to detect an edge of the picture frame. In place of such edge detecting sensor, an image sensor provided to detect densities of the respective pixels of the picture frame can be commonly used.

In a further embodiment, by detecting an advanced distance of the leading edge of a photographic film strip with the edge sensor, a picture frame of the photographic film strip to be printed is placed in position at the printing station.

In a still further embodiment, several means for positioning a picture frame at the printing station, such as the notch detector, picture frame detector, edge sensor and the like, are incorporated and are selected for use in order of a predetermined priority.

BRIEF DESCRIPTION OF THE DRAWINGS

The above objects and advantages of the present invention will become more apparent from the following detailed description when read in conjunction with the accompanying drawings, in which:

FIG. 1 illustrates the positional relation among a film mask, a bar code sensor and a negative film which shows the principal scope of the method of placing a picture frame in the film mask at the printing station according to the present invention:

FIG. 2 is an illustration showing placement of a latent image bar code indicating a frame number:

DETAILED DESCRIPTION OF THE INVENTION

Figure 3:
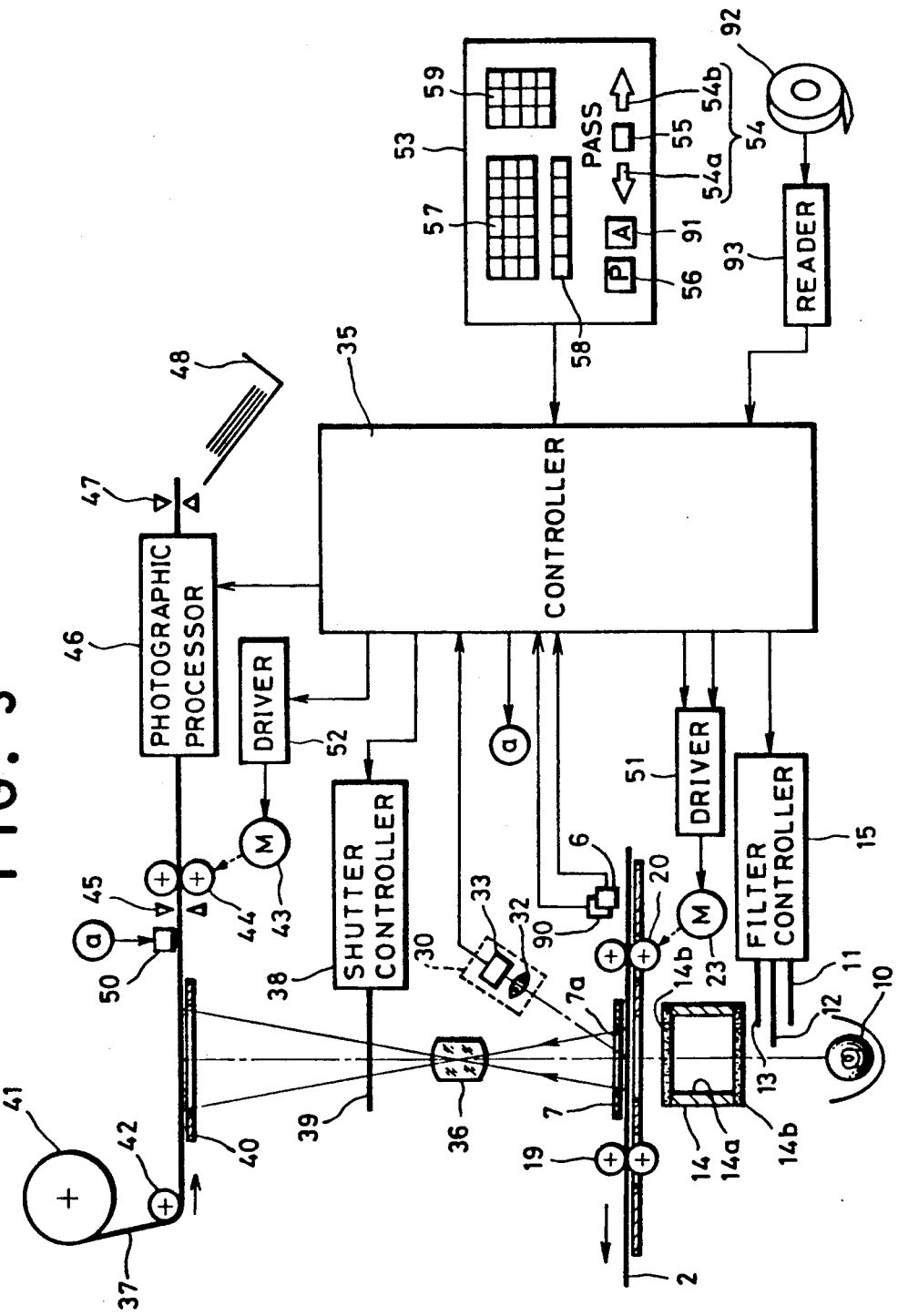
FIG. 3 is a schematic diagram showing a photographic printer embodying a method according to the present invention.

Referring now to FIG. 1, there is shown a negative film 2 viewed from the back. At a distance L from the center of the film framing mask 7, there is a bar code sensor 6 disposed near and after the film framing mask 7 at a printing station of a printer for reading bar codes. In this embodiment, a line image sensor is preferably used as the bar code sensor 6. However, other suitable sensors can be used in dependence upon types of bar code systems. The negative film 2 has bar codes 3 representing frame numbers (which are hereinafter referred to as frame number bar codes) on one side margin thereof and DX bar codes 4 representing a photographic character of the negative film 2. In addition to these bar codes 3 and 4, there are frame numbers in decimal figures on both of the side margins thereof. Each picture frame has associated therewith two frame numbers 5 in each side margin, one of which accompanies the reference character "A". The present or absence of a code bar of the frame number bar code can be detected by the bar code sensor 6 during the advancement of the negative film 2. The bar code sensor 6 can be a line sensor disposed along a direction oft he advancement of film or sensor unit having two light receiving elements spaced apart by the minimum width of a code bar. The two element sensor unit detects the width of code bar by judging whether the two light receiving elements provide outputs of the same level. If only one light receiving element is used, the width of code bar can be detected based on an output therefrom with reference to the speed of advancement of the negative film 2.

As will be described later, the frame number bar code 3 includes an entry code bar in transverse alignment with the entry code bar of the DX code 4. Therefore, it is possible to read the data on a frame number by detecting the presence of a bar code in the clock track of the DX code 4. A DX sensor for reading the DX code 4 is disposed in the passage of the negative film 2. To this end, two sensors, each consisting of four light receiving units arranged in two rows and two columns, can be mounted on both sides of the passage of the negative film 2 and on one side of the film framing mask 7, or four sensors can be mounted, two on each side of the film framing mask 7.

FIG. 2 shows an example of a frame number bar code. As well known in the art, various bar code systems are known in various fields; for example, "Interleaved 2 of 5", "Industrial 2 of 5", and "Code 3 of 9" as a bi-level bar code system. Any one of these bar code systems can be used in this invention. In this embodiment, "Code 3 of 9" is used for the five-bit data array 3a. In addition, entry and exit zones 3b and 3c are provided on the opposite sides of the data zone 3a, respectively, to allow the identification of the first and last bits of the data zone 3a. "Code 3 of 9" consists of wide and narrow bars and blanks (spaces) alternately arranged; a wider bar or space representing a binary 1 and a narrower bar or space representing a binary 0. As well known in the art, "Code 3 of 9" does not represent a binary number so that odd or even of a decimal number cannot be determined from the last bit bar. The frame number bar code 3 of the data zone 3a shown in FIG. 2 represents "001001100" in the binary system and means "24" in the decimal system. The correspondence between frame number bar codes (indicated by decimal number for convenience sake) and frame numbers is given in Table I by way of example.

TABLE I

| Frame number bar code (Decimal Number) | Frame Number |
| --- | --- |
| 0 | S |
| 1 | SA |
| 2 | 1 |
| 3 | 1A |
| 4 | 2 |
| 5 | 2A |
| . | . |
| . | . |
| . | . |
| 24 | 12 |
| 25 | 12A |
| . | . |
| . | . |
| . | . |
| 28 | 14 |
| 29 | 14A |
| . | . |
| . | . |
| . | . |
| 73 | 36A |

The length A of the frame number bar code 3 and the distance B from the center of the frame number 5 to the start bit 3b are predetermined and constant. Therefore, a distance C between the frame number 5 and the lagging edge of the last bit of the bar code of the array is constant. Furthermore, the pitch of the frame number bar codes and the pitch of the frame numbers 5 are constant and equal and take the value D.

In FIG. 1, when the bar code reader 6 reads a frame number bar code 3, the measurement of the length of advancement the negative film 2 is started, and simultaneously, frame number bar codes 3 is read and stored, so that the distance by which the frame number bar code 3 is displaced from the position of the bar code sensor 6 can be determined. The measurement of advanced length of the negative film 2 is effected referring either to the entry bar 3b or to the exit bar 3c. Therefore, the distance of a corresponding frame number 5 from the bar code sensor 6 can be determined by adding the distance B to the detected distance of the frame number bar code 3 when the entry bar 3b is used as the reference position for starting the film advance measurement. In the same manner, when using the exit bar 3c as the reference position, the distance C is added to the detected distance. In this embodiment, since the distance L between the bar code sensor 6 and the center of the film framing mask 7 is designed to be a half of the two times and half of the length of picture frame, locations of five frame number bar codes can be detected simultaneously.

Because picture frames 2a of the negative film 2 are arranged in line substantially at regular spacings or pitches, the negative film 2 is intermittently advanced by a length as long as a unit regular pitch. If the picture frame 2a is not accurately positioned in the film framing mask 7, the picture frame 2a is slightly moved back or forth to adjust its position. To this end, a fine adjusting key is manually operated. After the accurate positioning of the picture frame 2a, a frame number can be identified by detecting the two frame number bar codes 3 which are within a distance $L_3$ between the limits defined by a distance $L_0$ from the center of the film framing mask 7. This can be effected by detecting the frame number bar codes within the distance $L_2$ and out of the distance $L_1$.

The distance $L_3$ is to be slightly longer than both a unit pitch at which the frame number 5 is disposed in the margins of the negative film 2 and shorter than the length of a picture frame. If two frame numbers are detected simultaneously within $L_3$, either one without the indication "A" or one whose advanced length is closer to the length L than the other is selected. If the distance $L_3$ is made equal to the length of a picture frame, it is necessary to change the length $L_3$ according to the sizes of picture frames; half size frame and full size frame. In detecting the advanced position of the frame number bar code 3, it is apparent that one is on the right side of the center of the film framing mask 7, the corresponding frame number 5 is relatively close to the center of the film framing mask 7 and that, on the other hand, one is on the left side of the center of the film framing mask 7, the corresponding frame number 5 is relatively far from the center of the film framing mask 7. Therefore, if detecting the position of the exit bar 3c, the right side extremity from center of the film framing mask 7 must be expanded by the length C.

Referring now to FIG. 3, there is shown a photographic color printer with which a method of specifying frame numbers of film according to the present invention is applied. As shown, there are three complementary color filters 11, 12 and 13, namely cyan, magenta and yellow. Each color filter 11, 12, 13 is controllably insertable independently of the other two between an illumination lamp 10 and a mixing box 14 which comprises a square hollow tube having inner mirrored walls 14a and top and bottom diffusion plates 14b. The white light from the lamp 10 passes through the color filters 11, 12 or 13 to regulate each color component of the white light into the mixing box 14 and is diffused thereby. The diffused light, after passing through a color negative film 2 placed between a film holder 17 and a film framing mask 7 so as to be held flat in the printing station, is focused on a color photographic paper 37 by means of a printing lens 36 to create a latent image of the negative film 2 under the control of a shutter 39 which is controlled by a shutter controller 38 to open and close. The negative film 2 is advanced from the left to the right relative to the printing station during film inspection, and from the right to the left during printing, respectively, by means of pairs of feed rollers 19 and 20 disposed on both sides of the printing station. The feed rollers 19 and 20 are cooperatively rotated in the normal or reverse direction by a pulse motor 23 through chains or the like. The film framing mask 7 is disposed over the film holder at the printing station to press down the negative film 2 against the film holder and maintain it flat. The film framing mask 7 has a framing aperture 7a formed therein to define an image area corresponding in size to the picture frame 2a of the negative film, as well known. The film framing mask 7 is lifted up and down by a solenoid (not shown) to allow the film 2 to move and to press the film against the film holder while it is inspected or printed. The bar code sensor 6 is disposed near the feed rollers 20.

An image sensor 30 constructed of a lens 32 and an image area sensor 33 is disposed obliquely above the printing station to measure three color components of the transmitted light from each point of the negative image of the picture frame of the negative film 2 placed in position at the printing station. Output signals from the sensor 30, after being translated into a mean transmission density, maximum and minimum densities and the like for each color, are sent to a controller 35.

The printing lens 36 is disposed above the printing station to project a negative image of each picture frame of the negative film 2 onto the photographic paper 37. A framing mask 40 is disposed between the printing lens 36 and the photographic paper 37. The photographic paper 37 is withdrawn from a roll of photographic paper 41 by one picture frame, and advanced by means of a guide roller 40 and a pair of rollers 44 driven by a pulse motor 43. A cutter 45 is provided after the framing mask 40 to cut the exposed photographic paper 37 to provide print strips, each including a predetermined number of picture frames. The paper strip is sent to a photographic processor 46 where it is subjected to photographic processing, cut into individual prints by a cutter 47 and delivered into a tray 48.

A number printer 50, actuated by printing signals from the controller 35, is disposed just after the exposure position to print frame numbers on the back of the photographic paper 37 after exposure. The frame number is printed, for example, in the form of a dot pattern. Instead of the number printer 48, a character printing unit such as having a liquid crystal panel, a light emitting diode array or the like can be used to print frame numbers of, for example, dot pattern, in one side white margin of the photographic paper simultaneously with negative image printing. Alternatively, a character printing apparatus can be provided in addition to the photographic printing apparatus, which character printing apparatus reads and stores frame numbers in a floppy disk or the like. The floppy disk and the developed photographic paper are set in the character printing apparatus to print the frame numbers on the developed photographic paper. Then, the photographic paper is cut into the respective prints.

The direction and the number of rotations of the pulse motors 23 and 43 are controlled by means of the drivers 51 and 52, respectively, under the control of the controller 35. The controller 35 mainly consists of a microcomputer, which also controls the filter controller 15, the shutter controller 38, other necessary elements, and an exposure based on the large area transmittance density of each picture frame.

A keyboard 53 is provided with a fine adjustment key 54 for accurately positioning the negative film 2, a pass key 55 for passing over a picture frame that is not to be printed, a print start key 56 for initiating the printing process, correction keys 57 and 58 for entering correction data regarding density and color, respectively, and an alphanumeric key 59. The fine adjustment key 54 includes two keys 54a and 54b for the advancement of the negative film back and forth, respectively.

Figure 4:
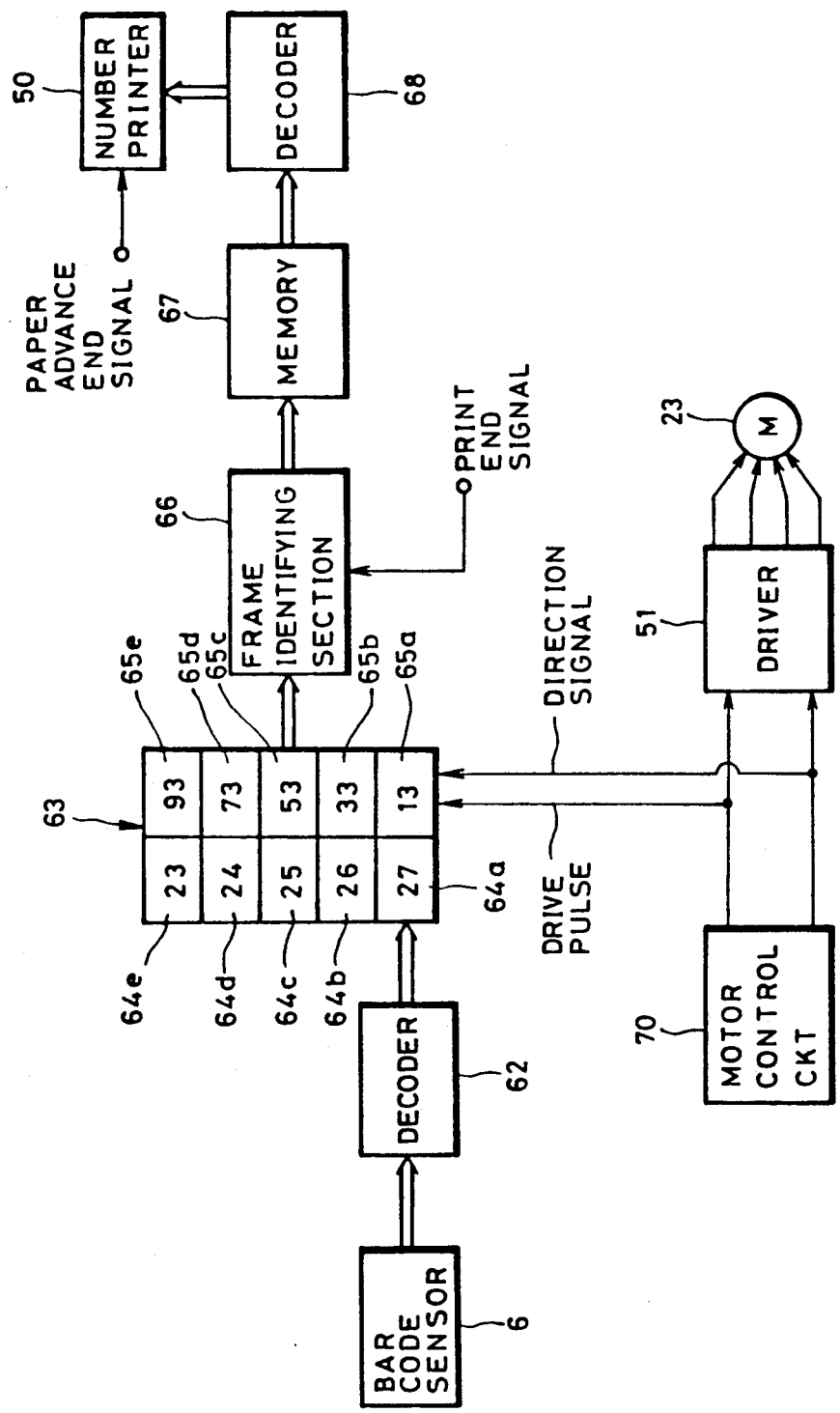
FIG. 4 is a block diagram showing a part of a controller shown in FIG. 3.

FIG. 4 shows details of an essential part of the controller 35, for use in reading and printing a frame number. As was previously described, the negative film 18 is printed with the frame number bar code 3 in one side margin thereof, and the DX code 4 on the other side margin thereof. The frame number 5 is printed in both side margins of the film 18. The frame number bar code 3 is read with the bar code sensor 6 and converted into binary numerical data with a decoder 62, which data are stored in a memory 63. The memory 63 has two memory sections, each having, for example, five memories 64a-64e, 65a-65e for storing five frame numbers and the numbers of drive pulses corresponding to the frame numbers. The respective frame number memories 64a-64e renew their binary numerical data with the binary numerical data stored in the adjacent memories prior to each storage of new binary numerical data in the memory 64a. The respective drive pulse number memories 65a-65e store the number of pulses needed to move the negative film to detect the corresponding frame numbers. The data stored in the memory is changed by an increment of one every time the driver 51 receives one driving pulse. The drive pulse number memories 65a-65b therefore constitute frame number counters. Since the drive pulse number memories, in this embodiment, start to store or count drive pulses upon the bar code sensor 6 detecting the exit bar 3c, the drive number memories 65a-65e are present to the number of pulses corresponding to the length C shown in FIG. 2. The data in each drive pulse number memory 65 is shifted into the memory just above with the shift in the frame number memory 64.

Because the frame number bar codes 3 are at regular pitches and located at preselected or predetermined positions relative to the frame numbers 5, each of the memory sections 64 and 65 can be permitted to have only one memory, for example the memory 64a, 65a. In this case, the latest binary numerical data and the number of drive pulses corresponding to the binary numerical data are stored in the memories 64a and 65a, respectively. The data in the memory 65a is increasingly renewed by the number of drive pulses corresponding to the pitch at which the frame number bar code 3 is arranged and the data in the memory 64a is changed by increment of one to detect a frame number close to the film framing mask 7.

A frame identifying section 66 retrieves the binary numerical data corresponding to the number of drive pulses within a certain range of numbers of driving pulses from the memory 63 when the picture frame 2a of the negative film 2 is placed in the printing station, and then writes it in a memory 67. The binary numerical data stored in the memory 67 is decoded by a decoder 68 and translated or decoded into a frame number. According to the translated or decoded frame number, the number printer 50 prints the frame number on the back surface of the exposed color photographic paper 37 advanced to the number printer 50.

A motor control circuit 70 provides a predetermined number of drive pulses upon starting or after printing and sends them to the drive pulse number memory section 65a-65e and the driver 51, the driver 51 controls the pulse motor 23 to rotate through a certain number of revolutions so as to advance the negative film 2 by a certain distance. Even when the fine adjusting key 54 is operated, the motor control circuit 70 provides divided drive pulses to cause the pulse motor 23 to rotate slowly. The memories 65a-65e count up or down the drive pulses thus provided according to the directions of rotation of the pulse motor 23.

Figure 5:
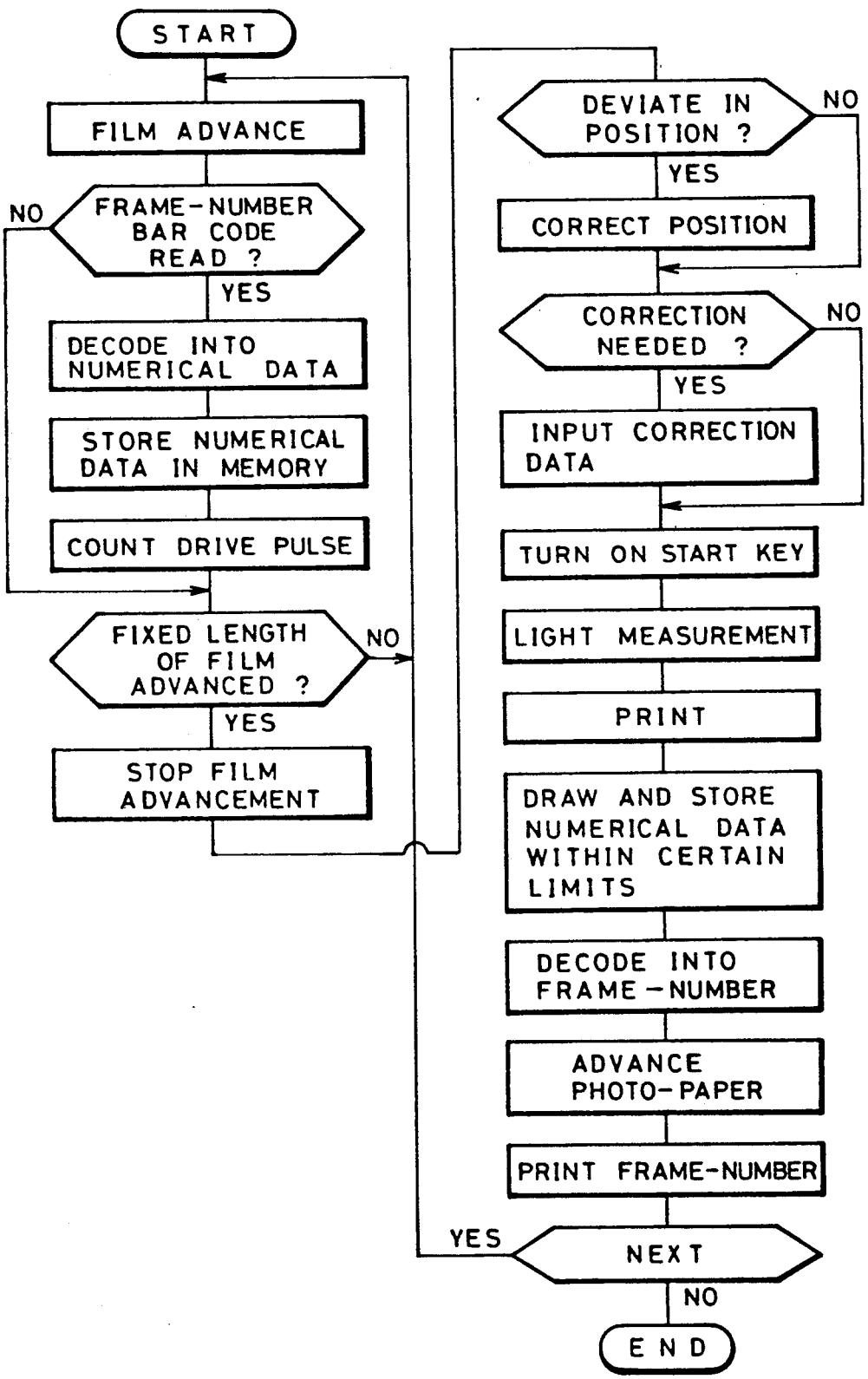
FIG. 5 is a flow chart showing the procedure of the printing process.

Operation of the photographic printer with which the present invention is applied and described above will be described with reference to FIG. 5 in association with FIG. 3. When turning a power switch (not shown) on after having placed the negative film 2 over the film holder, the motor control circuit 70 is actuated to provide drive pulses. With the application of the drive pulses, the pulse motor 23 starts its rotation to advance the negative film 2 in a direction shown by an arrow in FIG. 3. During the advancement of the negative film 2, the bar code sensor 6 reads one frame number bar code 3 printed on the side margin of the negative film 2. Synchronously with the reading of the frame bar code, the drive pulses applied to the pulse motor 23 are counted and the pulse number memory 65a stores the counted number of the drive pulses while the frame number memory 64 stores a binary numerical data into which the frame number bar code 3 thus read is translated or decoded by the decoder 62. The counted number stored in the memory 65a is changed and renewed by increment of one every time the driver 51 receives one drive pulse.

When the bar code sensor 6 reads another frame number bar code 3 next to the frame number bar code 3 already read, the binary numerical data in the frame memory 64a is shifted into the above memory, namely the frame number memory 64b, and simultaneously the number of drive pulses in the drive pulse number memory 65a is shifted into the above memory, namely the drive pulse number memory 65b. The memory 65b continues to count drive pulses adding to the shifted number of drive pulses. After shifting the number of drive pulses, the memories 64a and 65a store the binary data representing the just read bar code and the number of driving pulses corresponding to the binary numerical data. In the same manner, the shifting and renewing of binary numerical data and the drive pulse counting are effected.

When the motor control circuit 70 provides a predetermined number of drive pulses, the pulse motor 23 stops its rotation to suspend advancement of the negative film 2. Thereafter, the negative film 2 is examined to place the picture frame 2a in position in the film framing mask 7. If, in fact, the negative film 2 is out of position, the fine adjusting key 54 is operated to correct the negative film 2 in position so as to place the picture frame 2a properly in the film framing mask 2. Responding to the operation of the fine adjusting key 54, the motor control circuit 70 provides a direction signal indicating a direction in which the pulse motor 23 is to rotate and provides drive pulses. According to the direction signal and the drive pulses, the pulse motor 23 rotates slowly in the direction indicated by an arrow in which the fine adjusting key 54 is pushed, so as to move the negative film forwardly or backwardly. Each of the drive pulse number counters 65a–65b increments or decrements by the drive pulses provided as a result of the operation of the fine adjusting key 54.

Then, the negative film 2 at the printing station is observed to determine whether the picture frame 2a of the negative film 2 is to be printed or not and whether the picture frame 2a of the negative film 2 may produce a subject failure in its print. If no print of the picture frame 2a is needed due to, for example, an out-of-focus image, the pass key 55 is operated to advance the negative film 2a so as to replace the picture frame 2a with another one. If it is expected that a print made from the picture frame 2a will be accompanied with a subject failure and therefore will have poor color density and/or color balance, then the color and density correction keys 57 and 58 are operated to manually enter exposure correction data.

When operating the print key 56, the image sensor 30 measures the negative image of the picture frame 2a to detect large area transmittance density, maximum and minimum density for each color and then data is sent to the controller 35. In the controller 35, an exposure for the picture frame 2a is calculated using the data detected automatically and the exposure correction data that has been manually entered. According to the resultant exposure, the filter controller 17 controls the filters 11–13 independently, and the lamp 10 is excited to emit light at its full rate for a predetermined time. Then, the shutter controller 38 controls the shutter 39 to open for an appropriate time, so as to expose the photographic paper 37.

After the completion of printing the picture frame 2a, the frame identifying section 66 selects binary numerical data in one of the memories 64a–64e corresponding to one of memories 65a–65e whose count of drive pulses is within certain limits and sends the binary numerical data to the memory 67. If the negative film 2 has 35 mm. full size frames and there are two binary numerical data within the certain limits, the memory 67 selects and stores the binary numerical data that does not correspond to a frame number having an indication "A". On the other hand, if the negative film 2 has 35 mm. half size frames and there are two binary numerical data within the certain limits, the memory 67 stores both of the two binary numerical data. The controller 35 then cause the pulse motor 43 to rotate, withdrawing the photographic paper 37 by one picture frame to place the unexposed portion in position at the exposure station. Thereafter, the controller 35 reads out the binary numerical data from the memory 67 and sends it to the decoder 68 to translate it into data representing the frame number with reference to Table 1 and sends it to the number printer 50. The number printer 50 drives the printing head in accordance with the inputted data of frame number to print a frame number on the back surface of the print of the first picture frame.

Each picture frame is printed in the similar manner as described above. After a predetermined number of picture frames have been printed on the photographic paper 37, the cutter 45 operates to cut the exposed portion of the photographic paper 37 and sends it to the photographic processor 46. The exposed, photographic paper is then subjected to the photographic processing by processor 46 and, thereafter, is cut into strips of picture frames to be ejected out into the tray 48.

Figure 6:
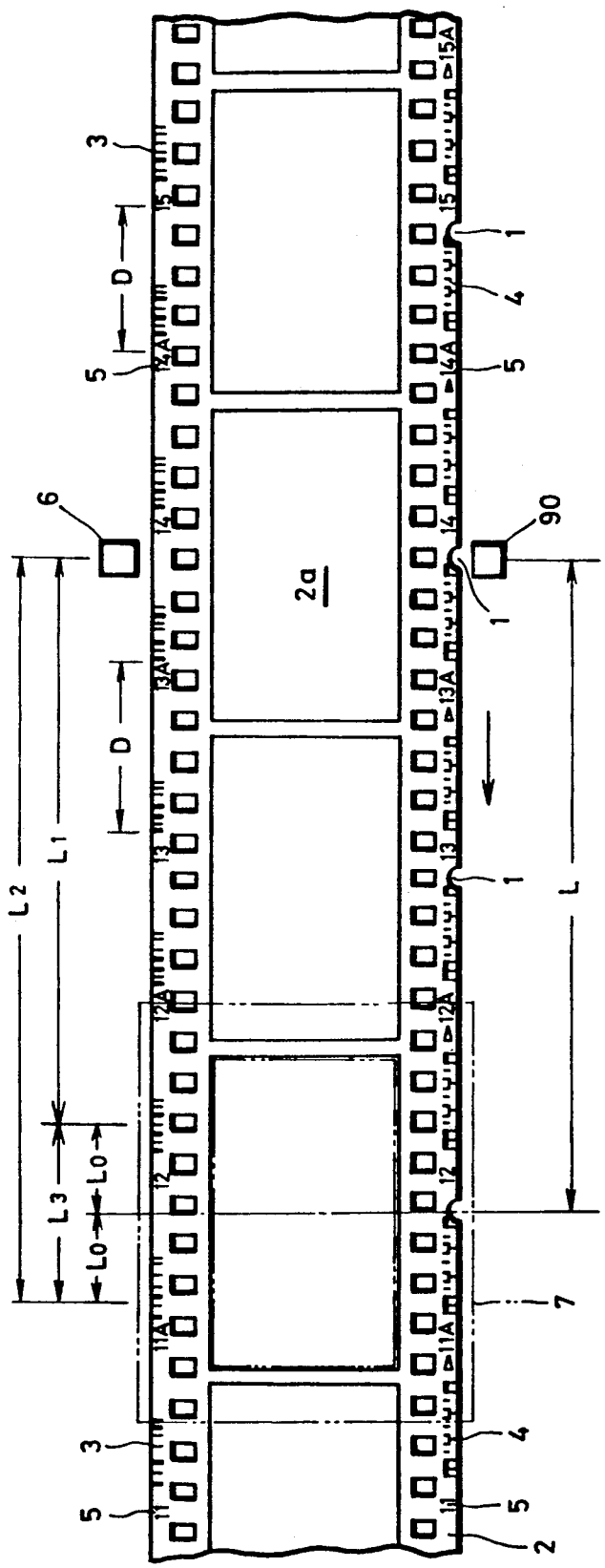
FIG. 6 illustrates the positional relation similar to that shown in FIG. 1, wherein a negative film is formed with notches in connection with picture frame to be printed.
Figure 7:
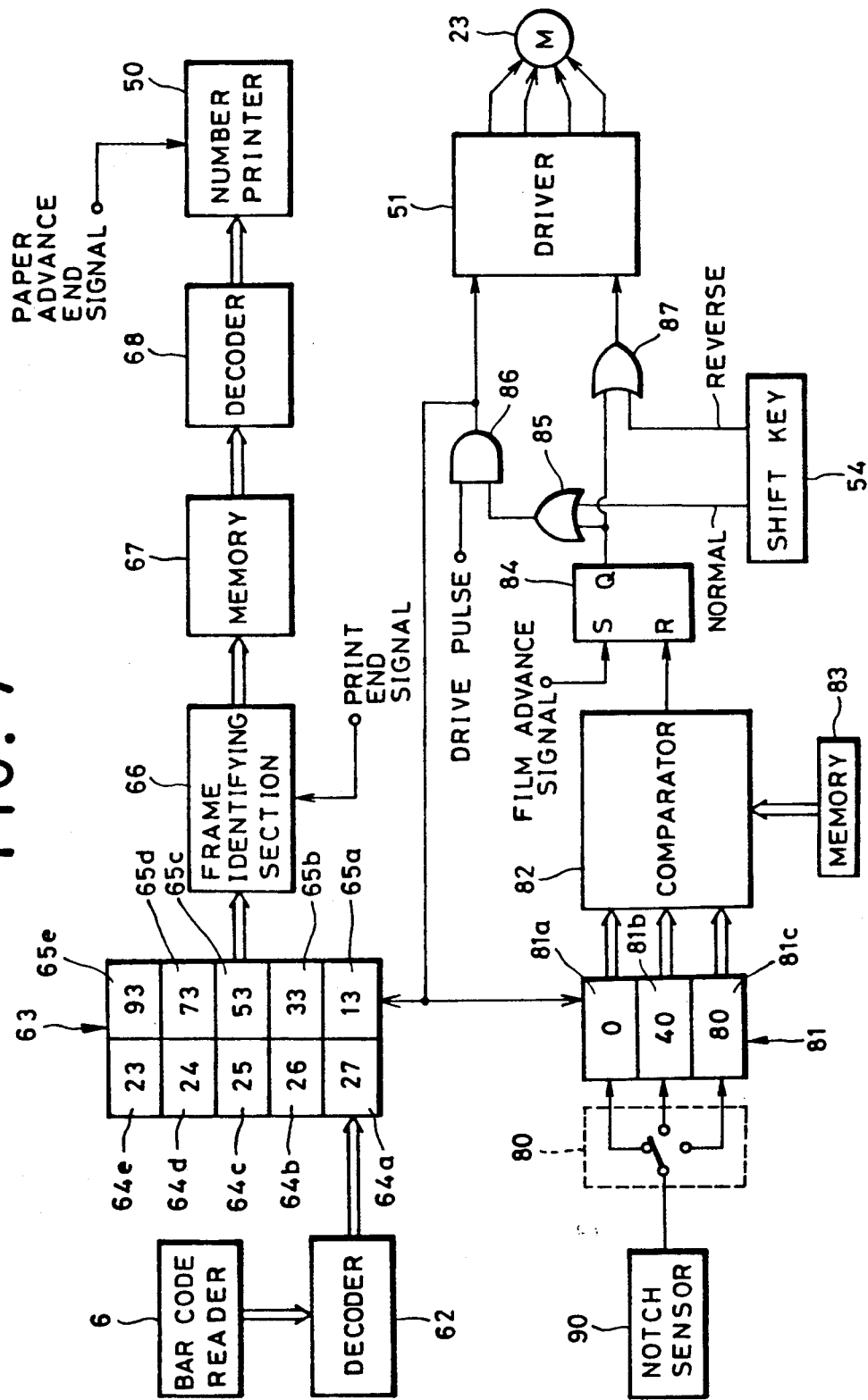
FIG. 7 a block diagram showing a part of a controller, similar to FIG. 4, embodying a method according to another embodiment of the present invention in which a picture frame is placed in position at the printing station by detecting a notch attached to the picture frame to be printed.
Figure 8:
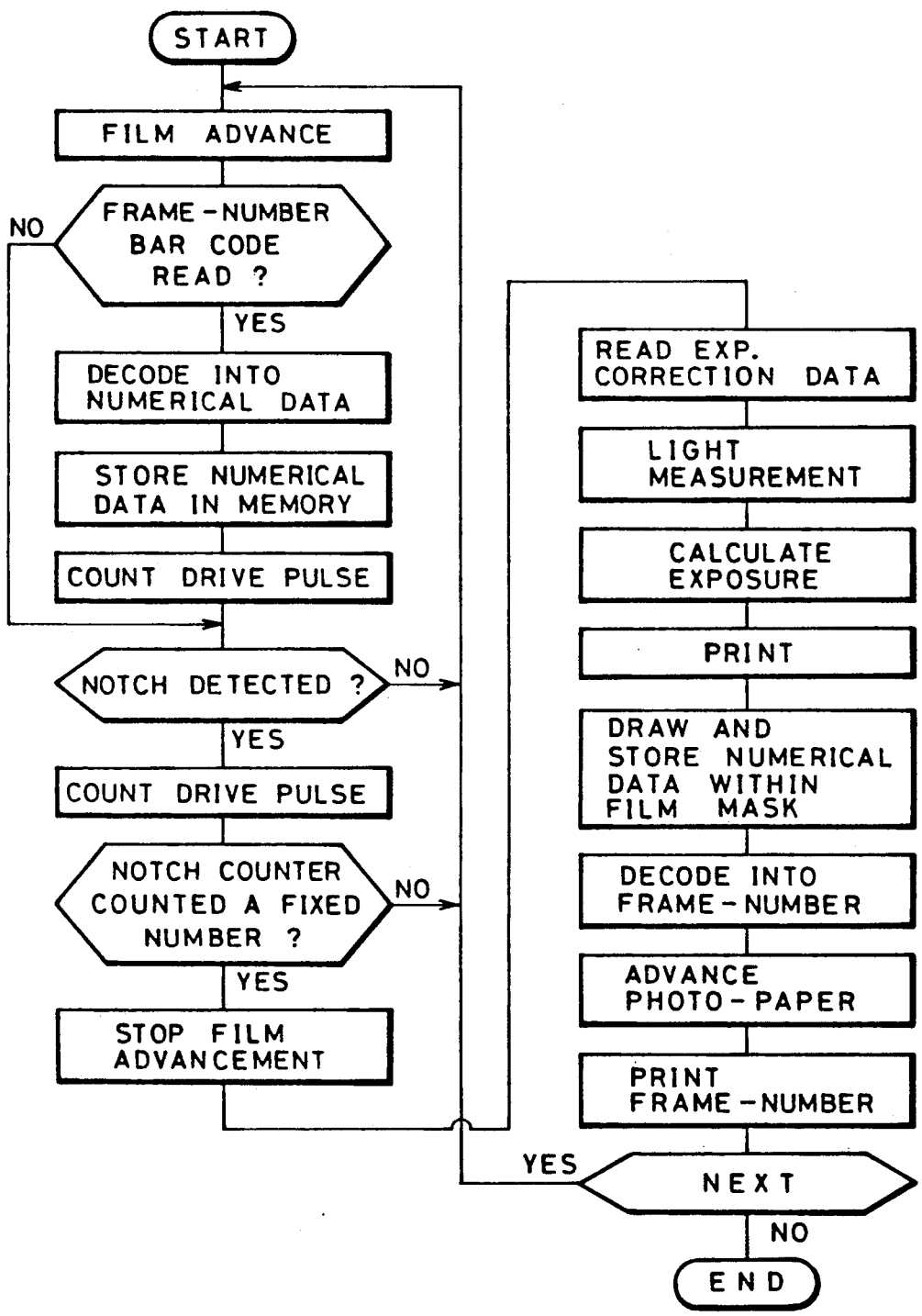
FIG. 8 is a flow chart showing the procedure of the printing process according to the method of FIG. 7.

FIGS. 6 to 8 show still another embodiment of the present invention which is applied to the color printer shown in FIG. 3. A particular feature of this embodiment is to identify a frame number of a picture frame of a negative film with side notches in position at a printing station. By detecting a side notch of the negative film at the center of the film framing mask with a notch sensor, the negative film is stopped. A frame number of the picture frame at the printing station is specified by a frame number existing within predetermined limits which are based on the distance between the bar code sensor and the center of the film framing mask. As shown in FIG. 6, a negative film 2 is formed with semicircular notches 1, one for each picture frame which is to be printed. The notch 1 is formed in the side margin where the DX bar code 4 is printed and located at the center of the picture frame of the negative film 2. At a certain distance from the center of the film framing mask 7 there is provided a notch sensor 90 to detect the notch 1. In this embodiment, the notch sensor 90 is at the same distance L as the bar code sensor 6 relative to the center of the film framing mask 7. The bar code sensor 6 and notch sensor 90 may be located at different distances from the center of the film framing mask 7. The notch sensor 90 detects the notch 1 to start measurement of the length of advancing negative film 2. The negative film 2, when advanced by a length equal to the distance between the notch sensor 90 and the center of the film framing mask 7, is stopped to place the picture frame 2a accompanied with a notch 1 in position in the film framing mask 7 at the printing station. In this embodiment, advanced distances of three notches 1 are measured at once and the negative film 2 is, therefore, continually advanced by a length equal to the distance between the two adjacent notches 1.

When the picture frame 2a is positioned to be printed, the frame number of the picture frame 2a at the printing station can be specified by detecting two of the five frame number bar codes 3 which are within a distance $L_3$ between the limits defined by a distance $L_0$ from the center of the film framing mask 7. This can be effected by detecting the frame number bar codes within the distance $L_2$ and out of the distance $L_1$.

FIG. 7 shows details of an essential part of the controller 35 for use in identifying and printing frame numbers. The number printer 50 is actuated in the same manner as described in connection with the embodiment in FIG. 4. The notch sensor 90 detects a notch 1 to provide a notch signal and send it to notch counter means 81 through a selector 80. The notch counter means 81 includes three counters 81a-81c which are selectively activated by the selector 80 to count drive pulses. Data on the number of drive pulses counted by the counters 81a-81c are transferred to a comparator 82 to be compared with data on the numbers of drive pulses corresponding to a distance L between the center of the film framing mask 7 and the notch sensor 90 stored in a memory 83. When the data of any one of the counters 81a-81c becomes coincident with the data stored in the memory 83, the comparator 82 provides a coincident signal and sends it to the reset-terminal R of a flip-flop 84 so as to thereby reset the flip-flop 84.

Upon resetting the flip-flop 84, the output terminal Q changes its output signal level to high "L", changing the output signal levels of OR and AND gates 85 and 86 to low "L". Consequently, the AND gate 86 shuts off drive pulses from passing therethrough and stops the pulse motor 23, stopping the negative film 2. At this time, the notch 1 attached to the picture frame 2a to be printed is located at the center of the film framing mask 7.

Operating the manual advancing key 54, a direction signal indicating the direction in which the pulse motor 23 is to be rotated is sent to driver 51 through the OR gate 87 and to the OR gate 85. As a result, the AND gate 86 opens to pass drive pulses, driving the pulse motor 23 in the direction according to the direction signal sent thereto so as to advance manually the negative film 2.

The pulse motor 23 rotates in the normal direction to advance the negative film 2 forwardly when the OR gate 87 provides a high level output "H" and, on the other hand, in the reverse direction to advance backwardly when the OR gate 87 provides a low level output "L". Since the OR gate 87 is connected to the flip-flop 84 at the Q terminal, the pulse motor 23 rotates in the normal direction at the end of printing of each picture frame.

Sequential operation of the photographic printer with which the frame identifying method according to the embodiment of the present invention is applied will be described with reference to FIG. 8 in association with FIGS. 3 and 7. After the inspection of picture frames of the negative film 2 and having set the negative film 2 in the film framing mask 7 and the punched tape 92 in the tape reader 93, the automatic operation key 91 and then the print key 56 are operated. The flip-flop 84 is set, causing the pulse motor 23 to rotate in the normal direction so as to advance the negative film forwardly as shown by an arrow in FIG. 6. During the advancement of the negative film 2, the bar code sensor 6 reads frame number bar code 3 printed on the side margin of the negative film 2 to provide frame number bar code signals. The frame number bar code signals are sent to the decoder 62 and are translated or decoded into binary numerical data therein and then stored in the frame number memory 64a. In the same manner as described in connection with the previous embodiments, the selected binary numerical data is finally converted into frame number data with the decoder 68 and sent to the number printer 50.

The notch counter means 81 starts to count drive pulses every time the notch sensor 90 detects a notch 1 during the forward advancement of the negative film 2. When the counted number with any one of the counters 81a-81c becomes coincident with the number stored in the memory 83, the comparator 82 provides a high level output "H", resetting the flip-flop 84 to close the AND gate 86 so as to stop the pulse motor 23, and hence the negative film 2, to thereby place the detected notch 1 at the center of the film framing mask 7.

After positioning the negative film 2, exposure correction data for the picture frame 2a associated with the detected notch 1 is read from the punched tape 92 with the tape reader 93 and inputted into the controller 35. Then, the image sensor 30 measures the picture frame 2a to detect a large area transmittance density of the picture frame 2a for each color and sends it to the controller 35. In the controller an exposure is calculated based on the detected large area transmittance density data and the exposure correction data from the punched data tape 92 for each color. According to the calculated exposures, the filter controller 17 controls the filters 11-13, independently, and the lamp 10 is excited to emit light at its full rate for a predetermined time. Then, the shutter controller 38 opens the shutter 39 for an appropriate time, so as to expose the photographic paper 37. Thereafter, the exposed color paper 37 is subjected to frame number printing, development and cutting in the same manner as described in connection with the previous exemplary embodiment.

In performing manual printing, the color and density correction keys 57 and 58 are operated to enter color and density correction data into the photographic printer after positioning the individual picture frame. Thereafter, the print key 56 is operated to effect the above-described sequential operation and becomes ready for the next printing after positioning the next picture frame with a notch 1.

Figure 9:
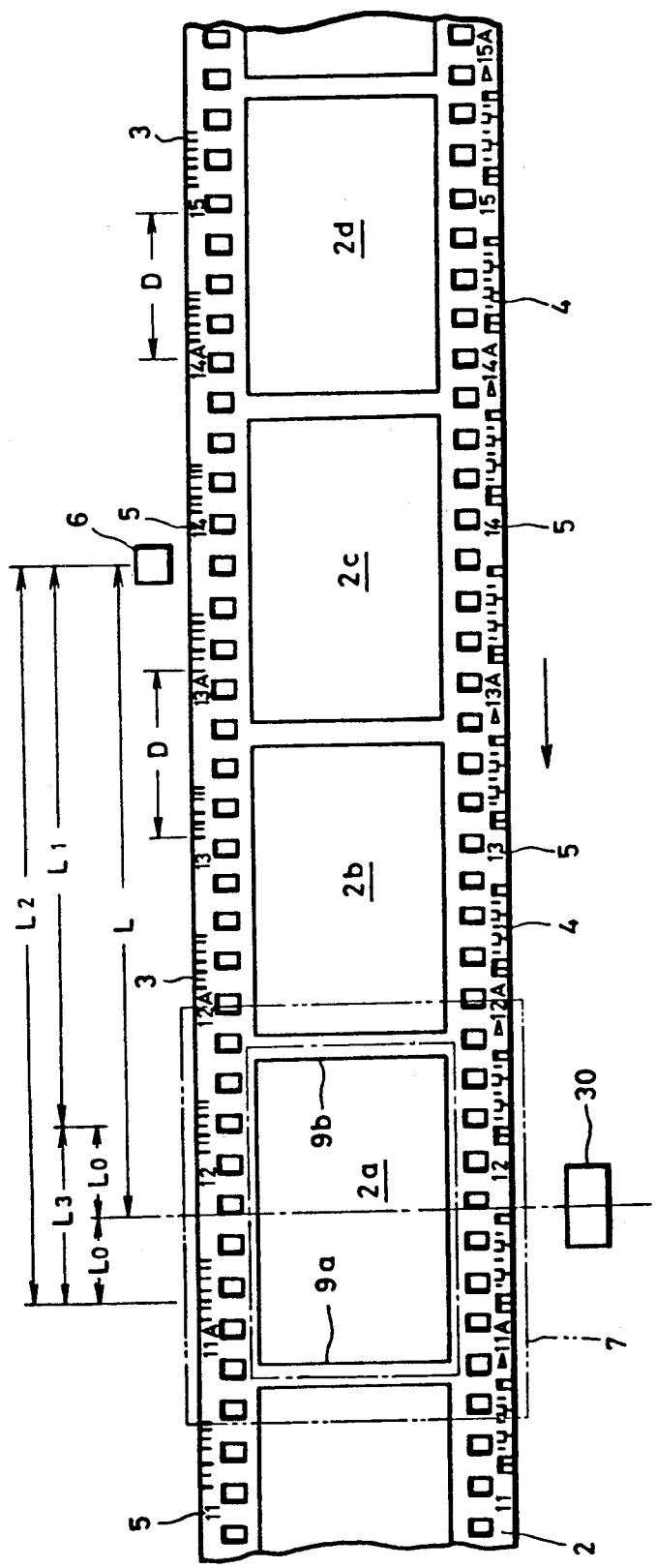
FIG. 9 illustrates the positional relation similar to that shown in FIG. 1, wherein an edge sensor is provided to detect edges of picture frames.
Figure 10:
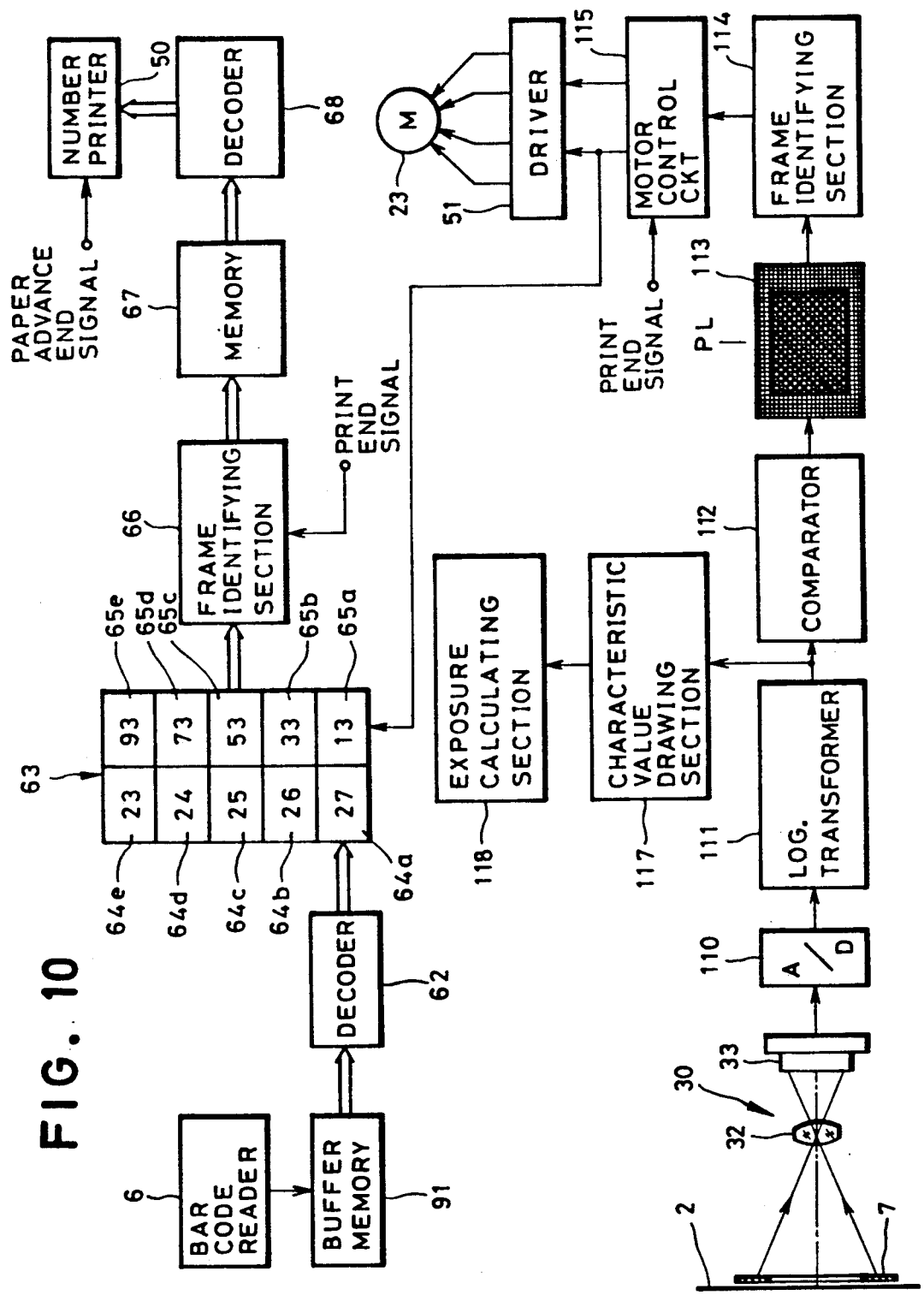
FIG. 10 is a block diagram showing a part of a controller, similar to FIG. 4, embodying a method according to still another embodiment of the present invention in which a picture frame is placed in position at the printing station by detecting an image of the picture frame to be printed.
Figure 11:
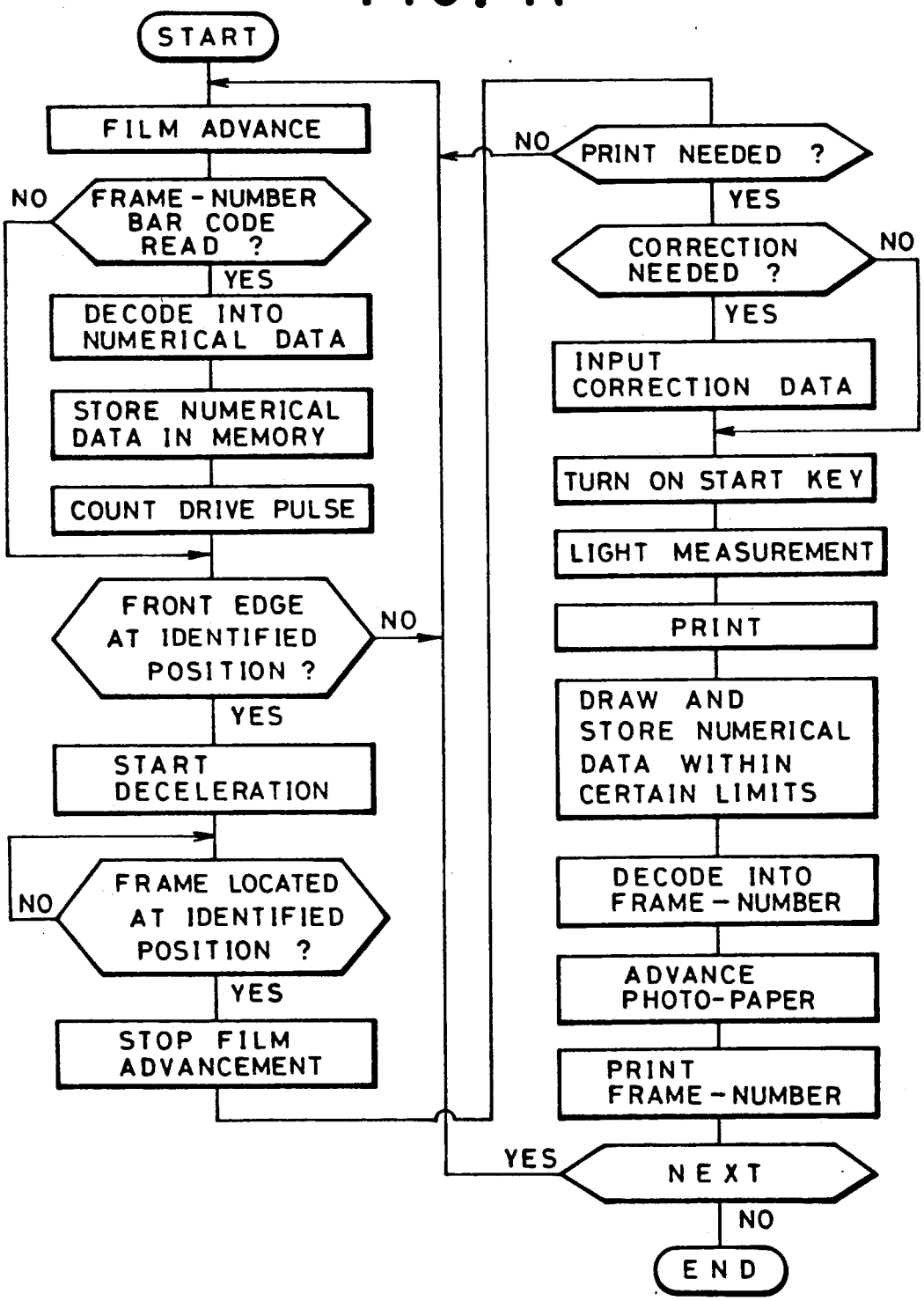
FIG. 11 is a flow chart showing the procedure of printing process according to the method of FIG. 10.

Referring now to FIGS. 9 to 11, there is shown another embodiment of the present invention which is applied to the color printer shown in FIG. 3. A particular feature of this embodiment is the detection of a negative film in position at a printing station by detecting the front and rear edges of a picture frame of the negative film. This is accomplished with an image sensor which measures the three color components of the transmitted light from each point of the negative image of the picture frame of the negative film placed in position at the printing station.

As shown in FIG. 9, an image sensor 30 is disposed to sight the center of the film framing mask 7 for detecting edges 9a and 9b of the picture frame 2a of the negative film 2 advancing in a direction shown by an arrow in FIG. 9 as well as three color components of light passed through the picture frame 2a. When the image sensor 30 detects the frame edges 9a and 9b at predetermined or preselected positions relative to the film framing mask 7, respectively, the negative film 2 is stopped so as to be placed in position in the film framing mask 7 at the printing station.

FIG. 10 shows details of an essential part of the controller 35, for use in identifying and printing frame numbers. As was previously described, the negative film 2 is printed with the frame number bar code 3 in one side margin thereof, and the DX code 4 on the other side margin thereof. The frame number 5 is printed in both side margins of the film 2. The frame number bar code 3 is read with the bar code sensor 6. After storing temporarily the output signal from the bar code sensor 6 in a buffer memory 91, it is converted into binary numerical data with the decoder 62, the binary numerical data being stored in a memory 63.

The image sensor 30, as is well known in the art, comprises a large number of pixels arranged in a matrix which convert incident light thereupon into electric signals and accumulate them in the form of an electric charge. The electric signals accumulated in the respective pixels are periodically read out to provide time-serial signals. The time-serial signals are converted into a digital form by an A/D converter 110 at a timing synchronized with reading out the electric charges from the image sensor 30. The digital signals are converted by a logarithmic transformer 111 to provide density signals, in particular signals representative of values proportional to densities, the density signals and then sent to a comparator 112.

As is well known, unexposed portions of the negative film 2 have a base density value lower than the density value of exposed frames of the negative film 2. Thus, an exposed frame can be detected by comparing the density value of an exposed frame with the base density value. A comparator 112 is provided having a threshold level representative of a density value slightly higher than the base density value to convert the density signals of each pixel of the picture frame from the logarithmic transformer 111 into a binary signal. The binary signal data is stored in a frame memory 113. The frame memory 113 stores the binary signal data in synchronism with the reading out of electric charges from the image sensor 30. As is illustratively shown in FIG. 10, a shadowed area of the frame memory 113 is allocated to one picture frame.

A frame identifying section 114 reads out binary signals for one line from the frame memory 113 to detect positions of the front and rear edges 9a and 9b of each picture frame and to find the center of the picture frame which lies halfway between the front and rear edges 9a and 9b. Since picture frames have indistinctive edges if exposed under artificial light, it is preferred to read out binary signals for a plurality of, for example three, lines, namely upper, middle and lower lines to find the center of a picture frame. At the time the center of the picture frame reaches the center position of the frame memory PL, the negative is stopped. For stopping gently the pulse motor 23, the pulse motor 23 begins to decelerate at a time the front edge 9a reaches a preselected point, for example, the center position PL of the frame memory 113.

A motor control circuit 115, under the presence of a print end signal, provides periodically drive pulses and sends them to the drive pulse number memory section 65a–65e and the driver 51 and simultaneously a direction signal indicating a direction of rotation to driver 51. The driver 51, when the frame identifying section 114 provides a deceleration signal, increasingly changes the period at which the drive pulses are provided therefrom to control the pulse motor 23 to decelerate.

The image sensor 30, after the negative film 2 is positioned to locate the picture frame in position, detects the three color components of light passed through the picture frame. The output from the image sensor 30, namely density signals, are sent to a characteristic value drawing section 117 to draw characteristic values, such as large area transmittance density value, maximum and minimum density values, a density value of a specific area of the picture frame and the like, for each color. Based on these drawn characteristic values provided for the respective colors, an exposure calculating section 118 calculates exposure for each color for controlling color filters 11–13.

Operations of the photographic printer with which the present invention is applied and described above will be described with reference to FIG. 11 in association with FIGS. 3 and 10. In advancing the negative film 2, the image sensor 30 periodically reads also the picture frame in the film framing mask 7 to provide time-serial signals which are, after having been subjected to digital and logarithmic conversions, changed into binary numerical data with the comparator 112 and stored in the frame memory 113. Since the frame memory 113 stores data in synchronism with the reading of the picture frame by the image sensor 30, it stores the latest binary numerical data.

The frame identifying section 114 reads out binary numerical data for one line from the frame memory 113 to detect the front edge 9a of the picture frame 2a. when the front edge 9a reaches the center PL of the frame memory 113, the frame identifying section 114 provides a deceleration signal and applies it to the motor control circuit 115. Under the application of a deceleration signal, the motor control circuit 115 periodically provides drive pulses with a period to slow down the pulse motor 23. The frame identifying section 114 also detects both the front and rear edges 9a and 9b to find the center of the picture frame and, when the center of the picture frame reaches the position PL, provides a stop signal and sends it to the motor control circuit 115, stopping the pulse motor 23 to thereby place the picture frame in position at the printing station.

As was previously described, after the picture frame 2a of the negative film 2 is placed at the printing station, picture frame inspection, light measurement, color paper exposure, frame number printing, and exposed color paper development are executed in sequence.

Because picture frames will often have indistinctive edges if they have been exposed under an artificial light, such as an electric flash light, it is preferred to identify a picture frame with reference also to a fixed length of advancement of the negative film 2. In particular, if the image sensor 30 fails to detect an edge even though the negative film 2 has advanced by as much as half of the pitch at which the picture frames are arranged, the frame identifying section 114 will specify the picture frame with reference to the length of advancement of the negative film 2 prior to the detection of the edges. In this case, when the negative film is advanced by a length as long as the pitch, the pulse motor 23 is stopped.

Figure 12:
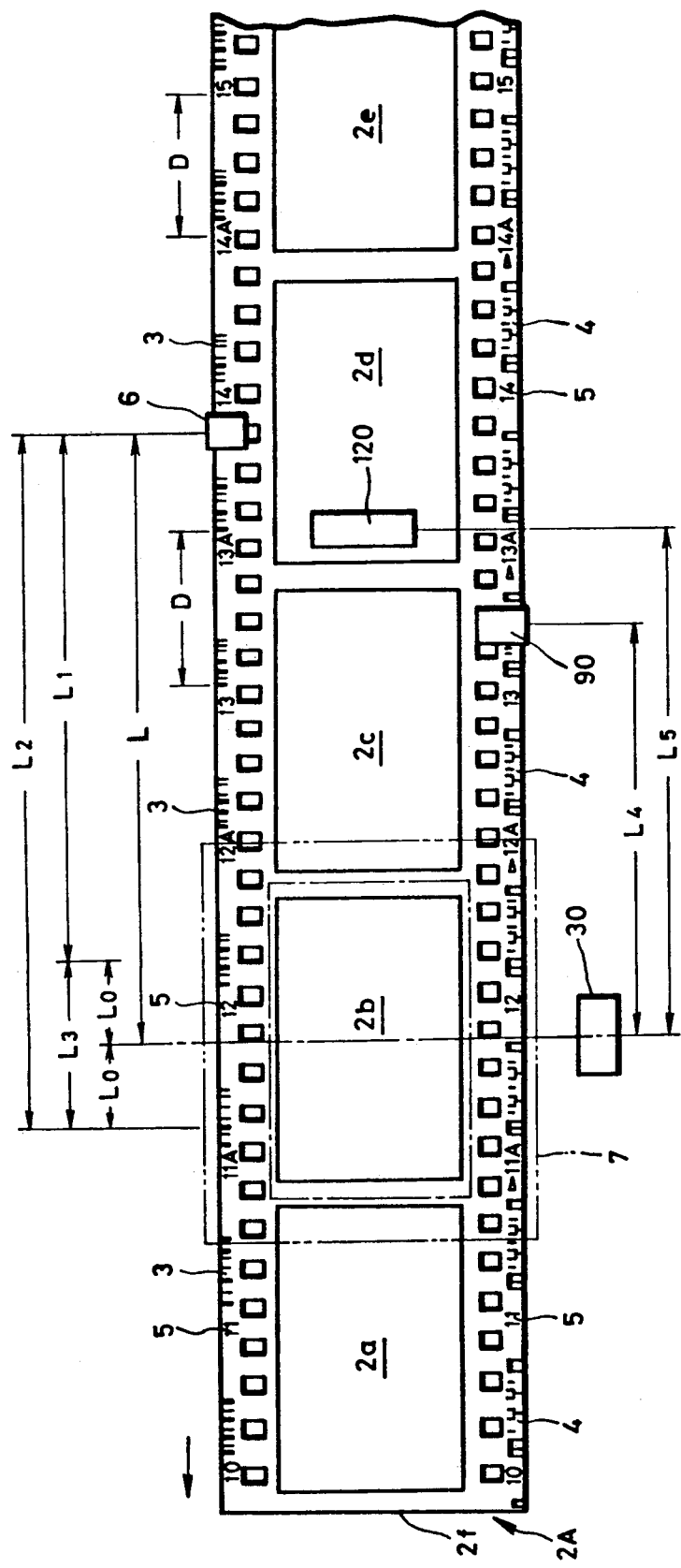
FIG. 12 illustrates the positional relation similar to that shown in FIG. 6, wherein a negative film is formed with notches in connection with picture images to be printed.
Figure 13:
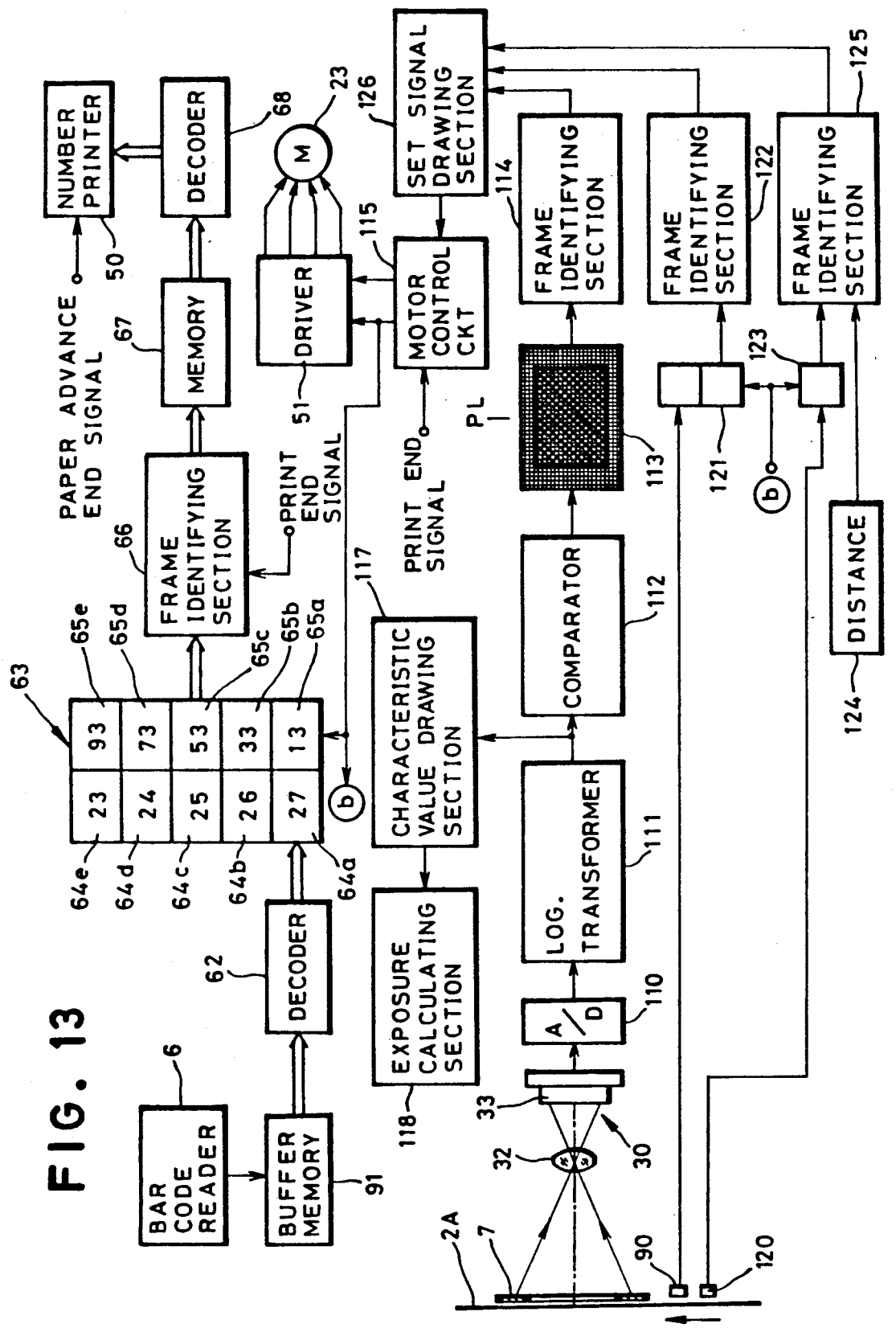
FIG. 13 is a block diagram showing a part of a controller, similar to FIG. 4, embodying a method according to a further embodiment of the present invention in which a picture frame is placed in position at the printing station by the use of one of several picture-frame-positioning means selected in order of a predetermined priority.
Figure 14:
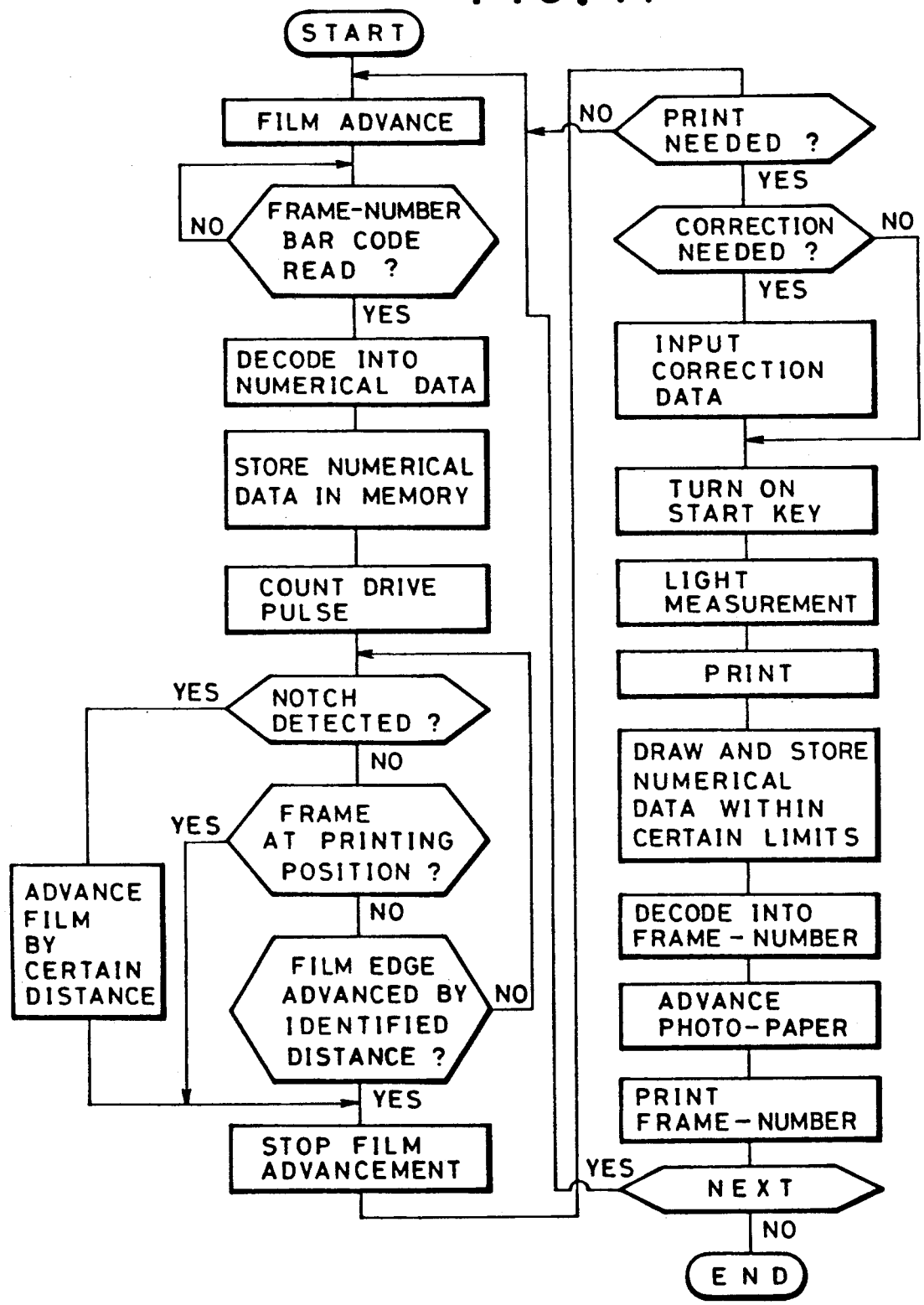
FIG. 14 is a flow chart showing the procedure of the printing process according to the method of FIG. 13.

Referring now to FIGS. 12 to 14, there is shown a modification or improvement of the embodiment shown in FIGS. 9 to 11. The improvement is suitable for printing a negative film strip. A negative film strip 2 includes a plurality of picture frames, for example, six frames. Such a negative film strip 2A is usually made from a 12, 24 or 36 exposure roll of developed film for the convenience of insertion into an envelope. The leading edge 2f of the negative film strip 2 is detected with an edge sensor 120 located at a certain distance $L_5$ from the center of the film framing mask 7. Since the distance of each picture frame 2a-2e from the leading edge 2f is previously known, each picture frame can be positioned by detecting an advanced length of the leading edge 2f of the negative film strip 2 after the detection of the leading edge 2f with the edge-sensor 120.

FIG. 13 shows details of an essential part of the controller 35, for use in identifying and printing frame numbers. In a large scale photographic laboratory, negative film strips are formed with notches aside picture frames which are to be printed in negative film inspection. When printing such a negative film strip with notches, the notch sensor 90 detects a notch to provide a signal which causes a counter 121 to count drive pulses from a motor control circuit 115. Upon the detection of a notch next to the detected notch, the counter 121 shifts its already counted value and restarts to count drive pulses. This means that the counter 121 can detect advanced lengths of two notches at once. A picture frame identifying section 122 decides whether the counter 121 has counted the number of drive pulses as many as sufficient to advance the negative film strip 2A by a distance $L_4$ between the film framing mask 7 and the notch sensor 90. The yes decision indicates that the picture frame to be printed is placed in position in the film framing mask 7 at the printing station. Then, the identification section 122 provides a set signal.

If printing a negative film strip without notches, it is impossible to position a picture frame which has indistinctive edges. To avoid such an impossibility of positioning the film with indistinctive edges, a counter 123 is provided to be reset with a signal provided from the edge sensor 120 and thereafter to count drive pulses. As was previously noted, since the distance of each picture frame 2a-2e from the leading edge 2f is predetermined, each picture frame can be positioned by measuring the advanced distance of the leading edge of the negative film strip 2A. For example, assuming that the picture frames are arranged at regular spacings of 2 mm. and the length of picture frame is 36 mm., the distance between the leading edge 2f and the center of the picture frame 2a is 20 mm. (18+2 mm). Accordingly, the first picture frame 2a of the negative film strip 2A can be positioned by stopping the advancement of the negative film strip 2A when the counter 123 counts up a number of drive pulses corresponding to $L_5+20$ mm. The second picture frame 2b is at a distance 58 mm. (2+36+2+18 mm), it is positioned by stopping the advancement of the negative film strip 2A when the counter 123 counts up drive pulses as many as corresponding to $L_5+58$ mm.

A memory 124 stores data of the numbers of drive pulses corresponding to distances of the respective picture frames 2a, 2b, ... from the leading edge 2f namely the distances of $(L_5+20)$ mm. $(L_4+58)$ mm, ..... An identifying section 125 checks the counted vale of the counter 123 with reference to the data in the memory 124 to provide a frame set signal.

A set signal drawing section 126 draws frame set signals from the identifying sections 114, 122 and 125 in predetermined priority order, for example, in order of notch detection, frame detection and leading edge detection. If the negative film strip 2A has notches, the notch detection is prior to the other two and the set signals drawing section 126 draws a frame set signal from the identifying section 122 to provide stop signals to the motor control circuit 115, thereby stopping the pulse motor 23 to position the picture frame. If the negative film strip 2A has no notches, the frame detection has priority over the leading edge detection, and the set signals drawing section 126 draws a frame set signal from the identifying section 114 to provide stop signals to the motor control circuit 115, thereby stopping the pulse motor 23 to position the picture frame. In the case where it is hard to detect a picture frame with the image sensor 30, the set signals drawing section 126 draws a frame set signal from the identifying section 125 to provide a stop signals to the motor control circuit 115, thereby stopping the pulse motor 23 to position the picture frame.

The motor control circuit 143, under the presence of a print end signal, provides a direction signal indicating a direction of rotation of the pulse motor 23 and sends it to the driver 51 simultaneously with periodic drive pulses which in turn are sent both to the driver 51, to drive pulse memories 65a-65e and to the counters 121 and 123. In order to avoid rapid stopping of the pulse motor 23, it is preferred to monitor the advancement of picture frame so as to cause the identifying section 114, 122 or 125 to provide a deceleration signal with which the period of drive pulse is prolonged.

Operation of the photographic printer with which the present invention is applied and described above will be described with reference to FIG. 14 in connection with FIGS. 3 and 13. In the advancement of the negative film strip 2A, the edge sensor 120 detects the leading edge 2f of the negative film strip 2A to provide a signal. Upon the provision of the signal, the counter 123 is caused to count drive pulses, thereby detecting an advanced length of the leading edge 2f of the negative film strip 2A. Because the negative film strip 2A shown in FIG. 12 is formed with no notches, the notch sensor 90 provides no notch signal and the counter 121 is not activated. Then, the identifying section 122 provides a signal indicating the absence of notch and sends it to the set signal drawing section 126.

The image sensor 30 measures periodically a picture frame of the negative film strip 2A in the film framing mask 7 to provide time-serial signals which in turn are changed to binary numerical data with the comparator 112 after having been subjected to digital and logarithmic conversions and then stored in the frame memory 113. Since the frame memory 113 stores the binary numerical data in synchronism with the reading of the picture frame with the image sensor 30, it stores the latest binary numerical data.

The frame identifying section 114 provides an edge signal when it detects both of the front and rear edges 9a and 9b of the picture frame 2a and sends it to the set signal drawing section 126. The edge signal indicates that the positioning of picture frame is effective by way of frame image detection. The frame identifying section 114 also detects both of the front and rear edges 9a and 9b to find the center of the picture frame and, when the center of picture frame reaches the position PL, provides a set signal and sends it to the set signal drawing section 126. On the other hand, the frame identifying section 125 provides a set signal according to a position to which the leading edge 2f of the negative film strip 2A is advanced. Because the image frame detection has priority to the leading edge detection, the set signal drawing section 126 draws a set signal from the frame identifying section 114. The set signal drawing section 126 thus receiving the set signal provides a stop signal and sends it to the motor control circuit 115, stopping the pulse motor 23 to thereby placing the picture frame in position at the printing station. In a same manner as described above, inspection of each picture frame and development of the exposed color paper are effected.

Frames will often have indistinctive edges if they have been exposed under an artificial light, such as an electric flash light. In this case, the set signal drawing section 126 draws a set signal from the frame identification section 125 prior to the frame identification section 114. Therefore, the negative film strip 2A is positioned with reference to the distance data in the memory 124.

In the case of negative film strips with side notches, the notch sensor 90 detects a notch to provide and send a notch signal to the counter 121. Consequently, the counter 121 starts to count drive pulses at one counting section. When the notch sensor 90 detects another notch, it causes the counter 121 to shift the previous count of the one counting section to the other counting section and restarts to count drive pulses at the two counting sections. Upon the counter 121 starting its counting operation, the set signal drawing section 126 receives a signal indicating that the notch priority film positioning is possible. When the distance detected by the counter 121 becomes equal to the distance L4 between the center of the film framing mask 7 and the notch sensor 90, a frame set signal is provided from the frame identifying section 122 and sent to the set signal drawing section 126. The, the set signal drawing section 126 provides and sends a stop signal to the motor control circuit 115 to stop the pulse motor 23.

In placing a picture frame at the printing station, it is permissible to manually place a picture frame in position in the film framing mask at the printing station while viewing the picture frame to be printed.

In the above embodiments, the frame identifying method of the present invention is applied to a printer in order to print frame numbers. The present invention can be embodied in a printer to automatically position a picture frame of a negative film or film strip to be reprinted. Furthermore, the present invention can be applied to negative film inspection apparatus. With such a negative film inspection apparatus, the exposure correction data or exposure amount data during the negative inspection process, and the identified frame number data are recorded or stored in a paper tape or a floppy disk. Such storage medium and the negative film are set in the photographic printing apparatus to print a photograph and a frame number.

Although the present invention has been fully described in connection with the preferred embodiments thereof with reference to the accompanying drawings, it will be apparent to those skilled in the art that various changes and modifications of the present invention are possible within the scope of the following claims.

What is claimed is:

1. A method of identifying a frame number of a picture frame of a photographic film placed in a film framing mask at a printing station, the photographic film including a series of picture frames each of which is accompanied with a decimal number and a bar code both being representative of the frame number, the photographic film being moved by a motor having drive pulses applied thereto, the method comprising the steps of:

passing said photographic film past a bar code detecting location toward said printing station, detecting said bar codes as they pass said bar code detecting location, keeping track of film movement from the point of detection of each said bar code to monitor the location of each detected bar code as it moves with said film to said printing station, the step of keeping track of film movement comprising counting said drive pulses from the point of detection of said bar codes; accumulating in a first counter the drive pulses occurring from the time a first bar code is detected; upon detection of a succeeding bar code, shifting the contents of said first counter to a second counter and continuing to count drive pulses in said first and second counters, whereby said counters represent advancements of said second and first bar codes, respectively; upon detecting of succeeding bar codes, further shifting and operating additional counters in the same manner as stated above whereby the first through nth counters accumulate counters representing the advancement of the nth through the first detected bar codes, respectively;

positioning a picture frame of said photographic film in said film framing mask at said printing station, and selecting a frame number of said latter picture frame by choosing a frame number corresponding to a bar code that has moved to within a predetermined range of distances from said detecting location.

2. A method as defined in claim 1, wherein said bar code representative of a frame number includes entry and exit bars.

3. A method as defined in claim 2, wherein the step of keeping track begins, for each bar code, at the detection of either one of said entry and exit bars by a bar code sensor.

4. A method as defined in claim 3 wherein said photographic film is moved by a pulse motor which is driven by drive pulses applied thereto; the step of keeping track of film movement comprising counting said drive pulses from the point of detection of said bar codes, whereby the accumulation of the count of drive pulses represents distance of advancement of said bar codes.

5. A method as defined in claim 2 wherein said photographic film is moved by a pulse motor which is driven by drive pulses applied thereto; the step of keeping track of film movement comprising counting said drive pulses from the point of detection of said bar codes, whereby the accumulation of the count of drive pulses represents distance of advancement of said bar codes.

6. A method as defined in claim 1 wherein said photographic film is moved by a pulse motor which is driven by drive pulses applied thereto; the step of keeping track of film movement comprising counting said drive pulses from the point of detection of said bar codes, whereby the accumulation of the count of drive pulses represents distance of advancement of said bar codes.

7. A method as defined in claim 1, wherein said positioning step is effected by advancing said photographic film by a predetermined certain length.

8. A method as defined in claim 1, wherein said positioning step is effected by detecting a length of the leading edge of said photographic film.

9. A method as defined in claim 1, wherein said positioning step is effected by detecting a notch formed in said photographic film on the center line of said picture frame.

10. A method as defined in claim 1, wherein said positioning step comprises, detecting a notch formed in said photographic film on the center line of said picture frame, detecting that said picture frame is in said film framing mask and detecting an advanced length of the leading edge of said photographic film.

11. A method as defined in claim 1, wherein said positioning step is effected by placing said picture frame in position in said film framing mask while viewing said picture frame.

12. A method of identifying a frame number of a picture frame of a photographic film placed in a film framing mask at a printing station, the photographic film including a series of picture frames each of which is accompanied by a decimal number and a bar code, both being representative of the frame number, comprising the steps of:
    passing said photographic film past a bar code detecting location toward said printing station,
    detecting said bar codes as they pass said bar code detecting location,
    keeping track of film movement from the point of detection of each said bar code to monitor the location of each detected bar code as it moves with said film to said printing station,
    positioning a picture frame of said photographic film in said film framing mask at said printing station, and
    selecting a frame number of said picture frame by choosing a frame number corresponding to a bar code that has moved to within a predetermined range of distances from said detecting location;
    wherein said photographic film is moved by a pulse motor which is driven by drive pulses applied thereto; the step of keeping track of film movement comprising counting said drive pulses from the point of detection of said bar codes, whereby the accumulation of the count of drive pulses represents distance of advancement of said bar codes; and
    wherein the step of keeping track further comprises accumulating in a first counter the number of drive pulses occurring from the time a first bar code is detected; upon detection of a succeeding bar code, shifting the contents of said first counter to a second counter and continuing to count drive pulses in said first and second counters, whereby values held by said counters represent advancements of said second and first bar codes, respectively; upon detecting of succeeding bar codes, further shifting and operating additional counters in the same manner as stated above whereby the first through nth counter accumulate counts representing the advancement of the nth through the first detected bar codes, respectively.

13. A method of identifying a frame number of a picture frame of a photographic film placed in a film framing mask at a printing station, the photographic film including a series of picture frames each of which is accompanied with a decimal number and a bar code, both being representative of the frame number, and a side notch, and said bar code being detected with a bar code sensor located at a predetermined distance from the film framing mask to identify the frame number of the picture frame, the photographic film being moved by a motor having drive pulses applied thereto, the method comprising the steps of:
    beginning to measure an advanced distance of the photographic film at the detection of said bar code so as to detect a moved distance of at least of said bar code and decimal number from the bar code sensor;
    keeping track of film movement from the point of detection of each said bar code to monitor the location of each detected bar code as it moves with said film to said printing station, the step of keeping track of film movement comprising counting said drive pulses from the point of detection of said bar codes; accumulating in a first counter the drive pulses occurring from the time a first bar code is detected; upon detection of a succeeding bar code, shifting the contents of said first counter to a second counter and continuing to count drive pulses in said first and second counters, whereby said counters represent advancements of said second and first bar codes, respectively; upon detecting of succeeding bar codes, further shifting and operating additional counters in the same manner as stated above whereby the first through nth counters accumulate counters representing the advancement of the nth through the first detected bar codes, respectively;
    detecting a side notch with a notch sensor located at a predetermined distance from said film framing mask to stop said photographic film when said detected side notch reaches the center of said film framing mask so as to thereby position a picture frame to be printed in said film framing mask at said printing station; and
    drawing a frame number represented by a decimal number or bar code whose moved distance is within a predetermined range of distances, thereby identifying said picture frame in said film framing mask to have said frame number.

14. A method as defined in claim 13, wherein said bar code representative of a frame number includes entry and exit bars.

15. A method as defined in claim 14, wherein said measurement of an advanced distance of said photographic film is begun at a detection of either one of said entry and exit bars by said bar code sensor.

16. A method as defined in claim 15, wherein said advancement of said photographic film is effected with a pulse motor and drive pulses applied to said pulse motor are counted to measure an advanced distance of said photographic film.

17. A method as defined in claim 14, wherein said advancement of said photographic film is effected with a pulse motor and drive pulses applied to said pulse motor are counted to measure an advanced distance of said photographic film.

18. A method as defined in claim 13, wherein said advancement of said photographic film is effected with a pulse motor and drive pulses applied to said pulse motor are counted to measure an advanced distance of said photographic film.

19. A method of identifying a frame number of picture frame of a photographic film placed in a film framing mask at a printing station, the photographic film including a series of picture frames each of which is accompanied with a decimal number and a bar code both being representative of the frame number, and said bar code being detected with a bar code sensor located at a predetermined distance from the film framing mask to identify the frame number of the picture frame, the photographic film being moved by a motor having drive pulses applied thereto, the method comprising the steps of:

beginning to measure an advanced distance of the photographic film at the detection of said bar code so as to detect a moved distance of at least of said bar code and decimal number from the bar code sensor;

keeping track of film movement from the point of detection of each said bar code to monitor the location of each detected bar code as it moves with said film to said printing station, the step of keeping track of film movement comprising counting said drive pulses from the point of detection of said bar codes; accumulating in a first counter the drive pulses occurring from the time a first bar code is detected; upon detection of a succeeding bar code, shifting the contents of said first counter to a second counter and continuing to count drive pulses in said first and second counters, whereby said counters represent advancements of said second and first bar codes, respectively; upon detecting of succeeding bar codes, further shifting and operating additional counters in the same manner as stated above whereby the first through nth counters accumulate counters representing the advancement of the nth through the first detected bar codes, respectively;

detecting an image of a picture frame with an image sensor to stop said photographic film when said picture frame is placed in position in said film framing mask so as to thereby position said picture frame to be printed; and drawing a frame number represented by a decimal number or bar code whose moved distance is within a predetermined range of distances when said picture frame is placed in position in said film framing mask, thereby identifying said picture frame in said film framing mask to have said drawn frame number.

20. A method as defined in claim 19, wherein said advancement of said photographic film is effected with a pulse motor and drive pulses applied to said pulse motor are counted to measure an advanced distance of said photographic film.

21. A method of identifying a frame number of a picture frame of a photographic film strip placed in a film framing mask at a printing station, the photographic film strip including a plurality of picture frames each of which is accompanies with a decimal number and a bar code, both being representative of the frame number, and said bar code being detected with a bar code sensor located at a predetermined distance from the film framing mask to identify the frame number of the picture frame, the photographic film strip being moved by a motor having drive pulses applied thereto, the method comprising the steps of:

beginning to measure an advanced distance of the photographic film strip at the detection of said bar code so as to detect a moved distance of at least of said bar code and decimal number from the bar code sensor;

keeping track of film movement from the point of detection of each said bar code to monitor the location of each detected bar code as it moves with said film to said printing station, the step of keeping track of film movement comprising counting said drive pulses from the point of detection of said bar codes; accumulating in a first counter the drive pulses occurring from the time a first bar code is detected; upon detection of a succeeding bar code, shifting the contents of said first counter to a second counter and continuing to count drive pulses in said first and second counters, whereby said counters represent advancements of said second and first bar codes, respectively; upon detecting of succeeding bar codes, further shifting and operating additional counters in the same manner as stated above whereby the first through nth counters accumulate counters representing the advancement of the nth through the first detected bar codes, respectively;

measuring an advanced distance of a leading edge of said photographic film strip to locate a picture frame to be printed in position in said film framing mask at said printing station with reference to distances of said plurality of picture frames from said leading edge previously measured; and drawing a frame number represented by a decimal number or bar code whose moved distance is within a predetermined range of distances when said picture frame is placed in position in said film framing mask, thereby identifying said picture frame in said film framing mask to have said drawn frame number.

22. A method as defined in claim 21, wherein said advancement of said photographic film strip is effected with a pulse motor and drive pulses applied to said pulse motor are counted to measure an advanced distance of said photographic film strip.

* * * * *